(12) United States Patent
Yee (10) Patent No.: US 8,001,237 B2
(45) Date of Patent: Aug. 16, 2011

(54) REMOTE MONITORING OF USER INPUT DEVICES

(76) Inventor: Young Yee, Las Cruces, NM (US)

( * ) Notice: Subject to any disclaimer, the term of this patent is extended or adjusted under 35 U.S.C. 154(b) by 57 days.

(21) Appl. No.: 12/053,415

(22) Filed: Mar. 21, 2008

(65) Prior Publication Data

US 2009/0240800 A1 Sep. 24, 2009

(51) Int. Cl.
*G06F 13/00* (2006.01)
(52) U.S. Cl. .......... 709/224; 709/219; 709/250
(58) Field of Classification Search ........ 709/217, 709/219, 223, 224, 225, 250
See application file for complete search history.

(56) References Cited

U.S. PATENT DOCUMENTS

| 6,903,681 B2* | 6/2005 | Faris et al. ........ 342/357.06 |
| 7,281,266 B2* | 10/2007 | Goodman et al. ........ 726/16 |
| 7,600,182 B2* | 10/2009 | Carr et al. ........ 715/222 |
| 2003/0218627 A1* | 11/2003 | Gusler et al. ........ 345/736 |
| 2005/0071445 A1* | 3/2005 | Siorek et al. ........ 709/223 |
| 2005/0278630 A1* | 12/2005 | Bracey ........ 715/704 |
| 2007/0261112 A1* | 11/2007 | Todd et al. ........ 726/11 |
| 2008/0005793 A1* | 1/2008 | Wenig et al. ........ 726/22 |

* cited by examiner

*Primary Examiner* — Viet Vu
(74) *Attorney, Agent, or Firm* — Luis M. Ortiz; Kermit D. Lopez; Melissa Asfahani (57) ABSTRACT

A precision data capture recorder/security device non-intrusively and precisely captures and records information from computerized input devices (e.g., computer keyboards and mouses). Information collected by a data capture recorder co-located with a client can be precisely date and time tag user input to a user interface (e.g., keyboard) and transmitted to a base collection station for archiving and analysis. Archived information provides accurate history logs for regulatory audit compliance, data security, and system administrative troubleshooting. Analysis can help determine whether user data input patterns at the user interface are authorized.

19 Claims, 9 Drawing Sheets

REMOTE MONITORING OF USER INPUT DEVICES

FIELD OF THE INVENTION

The present invention is generally related to system and methods for providing data security and auditing capabilities using networked computer systems. The present invention is also generally related to systems and methods for capturing keyboard keystrokes, monitoring input devices and monitoring information. More particularly, the present invention is related to a security device that non-intrusively captures and records information from computerized input devices such as keyboards and mouses, wherein the collected information can be precisely date and time tagged to provide accurate history logs for regulatory audit compliance, data security, and system administrative troubleshooting.

BACKGROUND

Monitoring all of the disparate security devices across an enterprise can be an over-whelming and daunting task. Despite spending on large amounts of resources for information technology (IT), in particular network and data security, current software tools are often found to be complex, expensive, inefficient given the typical generation of large amounts of unusable data, and significantly degrade computer performance. Yet there is a growing need where computer system and critical data are concerned to monitor super users of enterprise computer systems, maintain regulatory compliance within business sectors like stock trading and financial services, and data input as it pertains to computer system troubleshooting and data recovery. The monitoring of computer super users in particular is problematic because super users of a company's main computer systems typically already have complete access (via access/security codes) to all of the information technology resources and files within a company's computer system, including sensitive financial information and propriety data. Furthermore, software programs that enable monitoring are typically installed by the very super users having knowledge about how the same monitoring software can be temporarily disabled or bypassed.

As for an enterprise's ability to maintain regulatory compliance, major corporate and accounting scandals have caused changes in United States federal laws. Alleged and proven scandals by directors of these corporations resulted in a decline of public trust in accounting and reporting practices. Given past audit and regulatory compliance problems, governments are expected to be more diligent in enforcing stringent auditing and accountability requirements over financial institutions and public corporations. System are continually needed that can fulfill the need to comply with some or most of these requirements through monitoring.

Aside from auditing and regulatory compliance issues currently facing enterprises, critical data loss can often occur with computer system malfunctions. Numerous software programs running simultaneously on a single main frame server computer system during troubleshooting and data recovery operations, can lead to a catastrophic computer crash in which history logs would not be available.

Another problem that can be encountered where sensitive processes using computer systems are involved is over authorized user verification. Both the enterprise and the employee-user of a computer system engaged in sensitive functions should have concern over the un-authorized use of a computer system by a person that may have improperly gained access to usernames or pass codes. Un-authorized actions can be taken under such a scenario leaving the legitimate employee to blame. Also, the actual assailant may never be identified.

Based on the foregoing problems, what are apparently needed are systems and methods that enable the preservation of data and also enable data entry logging for audit purposes. Preferably, such a system can have a completely separate computer system that would have standalone applications of our product and that enables the capture and archiving of all keyboard actions by system users. The present invention addresses this need with a remote monitoring of user input devices that will help protect vital information, maintain data integrity, help with the identification of error leading to system failures and help regulated enterprises meet regulatory compliance.

SUMMARY OF THE INVENTION

The following summary will outline some of the more pertinent features of the present invention. These features should be construed to be merely illustrative of some of the more prominent features and applications of the invention. Other beneficial results can be achieved by using the disclosed invention in a different manner or changing the invention as will be described in more detail in the detailed description of the invention.

Accordingly, it is a feature of the present invention to provide for a security system including a precision Data Capture Recorder (DCR) adapted to non-intrusively and independently capture and record information entered on a user input devices such as keyboards, mouses, and digital pads.

In accordance with another feature of the present invention, the security system can include a remote base collection station (BCS) adapted to receive and archive data received from the DCR system. The data can be transmitted wirelessly or via physical network connections to a remote BCS.

A DCR can be installed along the communication link between a user input device and a computer resource (i.e., "in-line" between a user's computer and keyboard) or the DCR can be located within the computer system housing in order to further prevent tampering. The DCR can also be located within any housing associated with the user input device (e.g., keyboard).

In accordance with yet another feature of the present invention, the data security system includes a means adapted to precisely tag data entered into a user input device with accurate time and date information. Although time and date information can be provided by the user computer resource or user input device, more accuracy can be provided for data entry by synchronizing data entry with atomic clock or GPS broadcasted date and time information. Atomic clock or GPS information can be obtained wirelessly from government wireless transmissions of the same via satellite.

In accordance with still another feature of the present invention, data entry location information can be determined when mobile devices adapted with GPS capability are used during data entry. Location information can be utilized where mobile computing resources (e.g., laptops, PDAs) are used.

In accordance with another feature of the present invention, the data security system includes an analysis module adapted to monitor and analyze data transmitted to and/or stored in the BCS. The analysis module can be provided in the form of a computer system adapted with patent recognition software or a neural network adapted to recognize data entry patterns that are normal, abnormal, authorized, unauthorized.

The present invention can provide event correlation, auditing validation and notification through precision user input monitoring and analysis by combining an autonomous data capturing capability, resident within user systems, with secure, remote archiving.

In accordance with methods of using the invention, time/date/location tagged user input data can be monitored and archived in a secure data capture base station or secured remote server for later use in regulatory compliance, auditing, data entry backup, catastrophic system failure troubleshooting, and high level function/user monitoring.

In accordance with another feature of the present invention, an analysis module can analyze user input cadence/patterns and match them with a registered user template containing known user input cadence and patterns to determine if received user inputs are by an authorized/registered user.

For a more complete understanding of the present invention and the advantages thereof, reference should be made to the following Detailed Description taken in connection with the accompanying drawing.

DETAILED DESCRIPTION OF THE INVENTION

Figure 1:
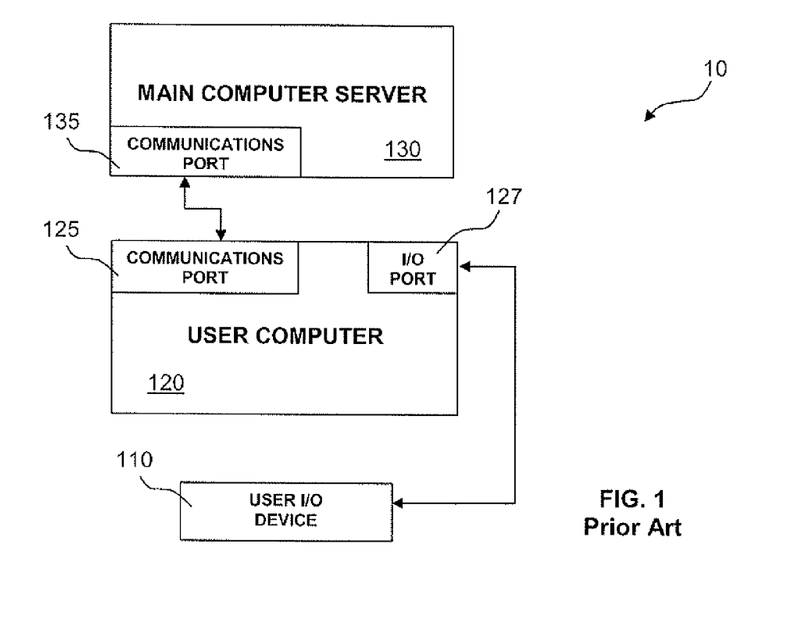
FIG. 1 illustrates a typical computer system, labeled as prior art, including a user input device (e.g., keyboard, mouse, keypad, etc.) connected to computer input/output port. The user computer can be connected to a main frame computer.

Referring to FIG. 1, labeled as prior art, a typical network architecture 10 for an enterprise including a user computer system 120 for each user in the enterprise including a communication port 125 to provide data network access to the user computer system 120 and a user input device 110 (keyboard, mouse, keypad, etc.), which is most always connected to a user computer system 120 (e.g., desktop computer) via an input/output port 127 on the user computer system 120. The connection is generally made via cabling (not shown), although wireless input devices are also currently available. It should also be appreciated, however, that the user input device 110 can be integrated with the user computer system 120 in the case of portable computers (e.g., laptops and personal digital assistants).

The user computer system 120 is typically connected to a main computer server 130 (e.g., enterprise server) through a data network via communication ports 135 (e.g., network switches, routers, etc.) associated with the main computer server 130. The typical enterprise computer system 10 includes several user computer systems 120 networked with a main computer server 130. A user computer system 120 includes a user input device 110 (e.g., keyboard, mouse, keypad, etc.) connected to the user computer system 120 via an input/output port 127. Most data security software when used operate within either of the user computer system 120 or the main computer server 130, or both.

Figure 2:
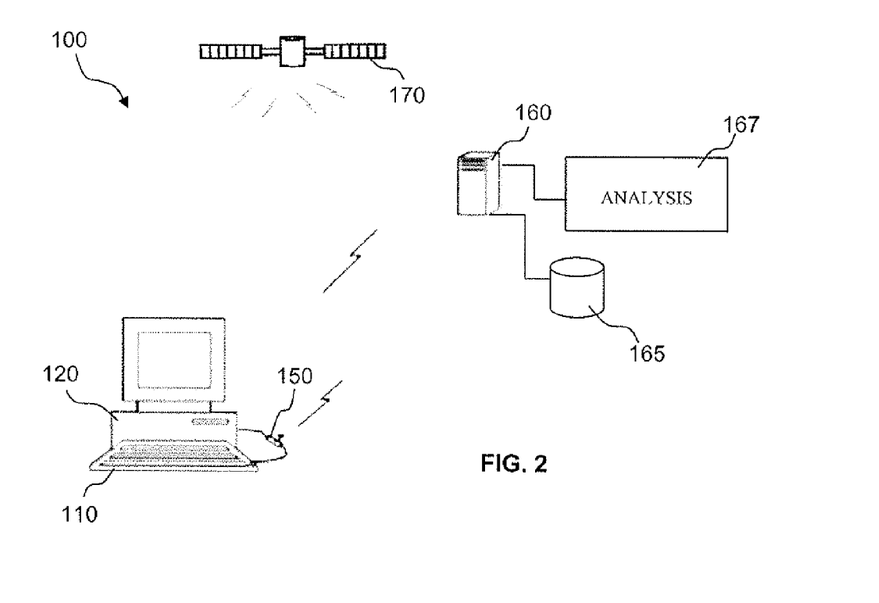
FIG. 2 illustrates a system diagram of a deployment scenario wherein accurate timing resource and remote archiving components that can be used in implementing the present invention.

Referring to FIG. 2, a system architecture 100 for a secure system in accordance with a feature of the present invention is illustrated. The security system can include a data capture recorder base collection station, a remote base collection station (BCS) 160 adapted to receive and archive 165 data received from the data capture recorder (DCR) 150, A DCR 150 can be installed along the communication link ("in-line") between a user input device 110 and the input/out port 127 for the user input device 110 located on the computer system 120 (i.e., "in-line" between a user's computer and keyboard). Although the DCR 150 can easily be installed within the communication link between a user input device 110 and its connection outside of a user computer system 120 housing, it should also be appreciated that the DCR 150 can also be located within the user computer system's 120 housing in order to further prevent tampering. The DCR 150 can also be located within any housing associated with the user input device 110. Input data can be transmitted wirelessly or via physical network connections to the remote BCS 160 where it can be archived 165 and/or analyzed 167.

Although time and date information can be provided by the user computer system 120 or user input device 110, more accuracy can be provided for data entry by synchronizing data entry with atomic clock or GPS 170 broadcasted date and time information. Atomic clock or GPS 170 information can be obtained wirelessly from government wireless transmissions of the same via satellite. Accurate date and time information can be provided with input data to record precise data entry by a user. Accurate date and time information can be provided by source that are readily available, yet reliable, such as atomic clock or global positioning satellite 170 broadcasts which are both represented by satellite icon 170 in FIG. 2.

Data entry location information can also be determined when GPS 170 capabilities are used during data entry. Location information can be utilized where mobile computing resources (e.g., laptops, PDAs) are used. The data capture recorder 150 can monitor user input at user input device 110, in real-time, and report the user inputs to a BCS 160. Finally, atomic clock or GPS 170 broadcast transmissions can be received by either of the data capture recorder 150 or BCS 160 to tag the data entries at the user input device 110. Atomic clock or GPS 170 can be accessed to obtain accurate time and date information for data entry tagging purposes. Where atomic clock or GPS 170 is used as the accurate time source, location can also be determined for DCR 150 or user computer system 120, which is useful for some mobile applications.

Figure 3:
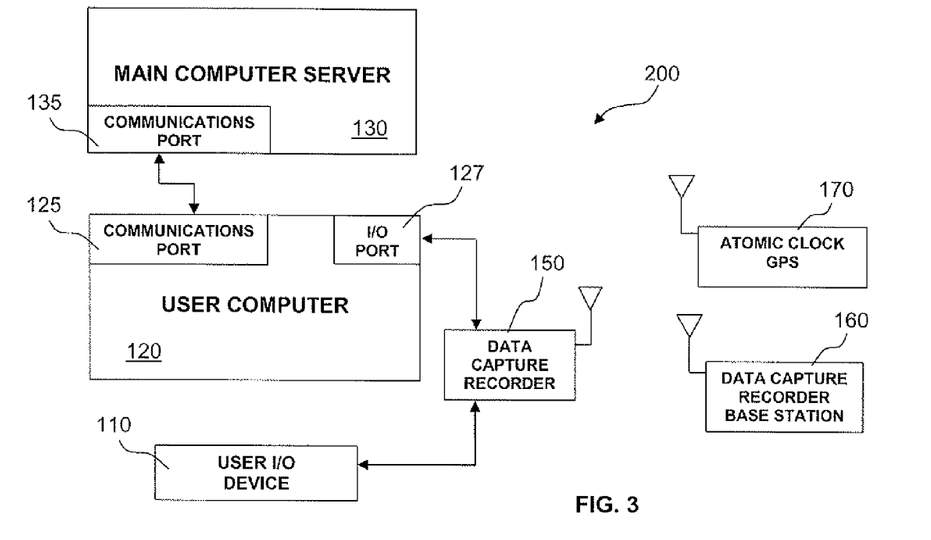
FIG. 3 illustrates a data security system including a precision Data Capture Recorder (DCR) device configuration with access to accurate time and date information and a remote DCR base station for remote data entry archival and/or analysis. The DCR device can be installed along the communication path (e.g., "in line") between the user's input device and the user's computer, and the captured data can be transmitted wirelessly or cabled to the DCR base station where the data can be precisely time/date tagged using atomic clock and/or GPS synchronization of the DCR.

Referring to FIG. 3, illustrated is a data security system 200 including a depiction of operating components that can be used to provide data security within the data security system 200. A precision Data Capture Recorder (DCR) 150 can be configured with access to accurate time and date information from an atomic clock or GPS 170 and a BCS 160 for remote data entry archival 165 and/or analysis 167. The accurate time broadcasting system can include Global Positioning satellites (GPS) and Atomic clock 170 resources that are available to the public. The DCR device 150 can be installed along the communication path (e.g., "in line") between the user's input device 110 and the user's computer system 120 as discussed in FIG. 1; however, data captured by the DCR 150 can be transmitted wirelessly or by cable to the BCS 160 wherein the data can be archived 165 for later retrieval. Archiving 165 can include at least one of precise time/date tagging and DCR 150 identification together with recorded data entries.

Figure 4:
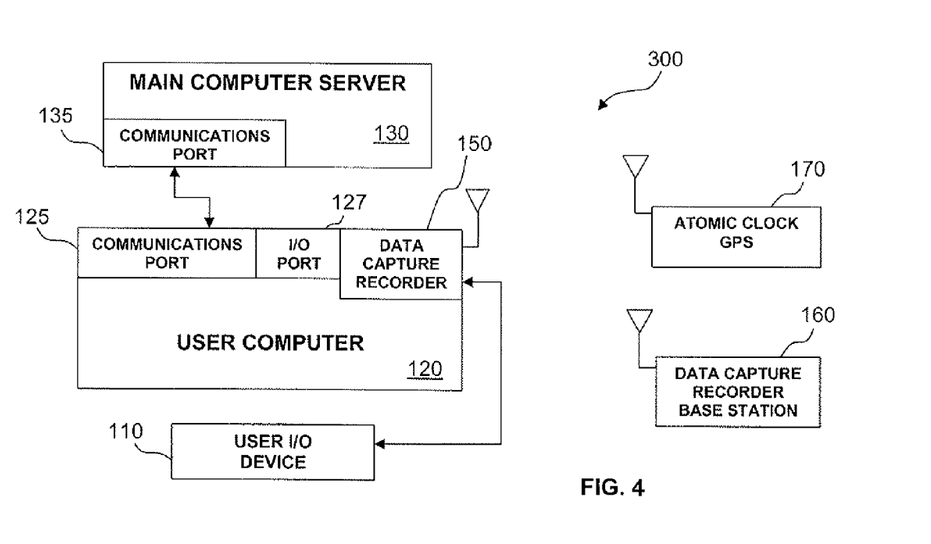
FIG. 4 illustrates another feature of the present invention wherein a precision Data Capture Recorder (DCR) can be installed between a user input device and computer resource, but within the computer resource to avoid tampering, and can include an accurate time module, which can include means to receive transmission form publically available Atomic clock and/or GPS resources.

Referring to FIG. 4, a system diagram 300 for another data security system illustrates another feature of the present invention wherein a precision Data Capture Recorder (DCR) 150 can be installed between a user input device 110 and user computer system 120, but within the user computer system 120, which can prevent tampering or user input device 110 substitution as a means to circumvent the DCR 150. Also as shown in FIG. 4, a data security system can also include a DCR 150 with an atomic clock or GPS 170, which can include means to receive transmission form publically available Atomic clock and/or GPS resources.

Figure 5:
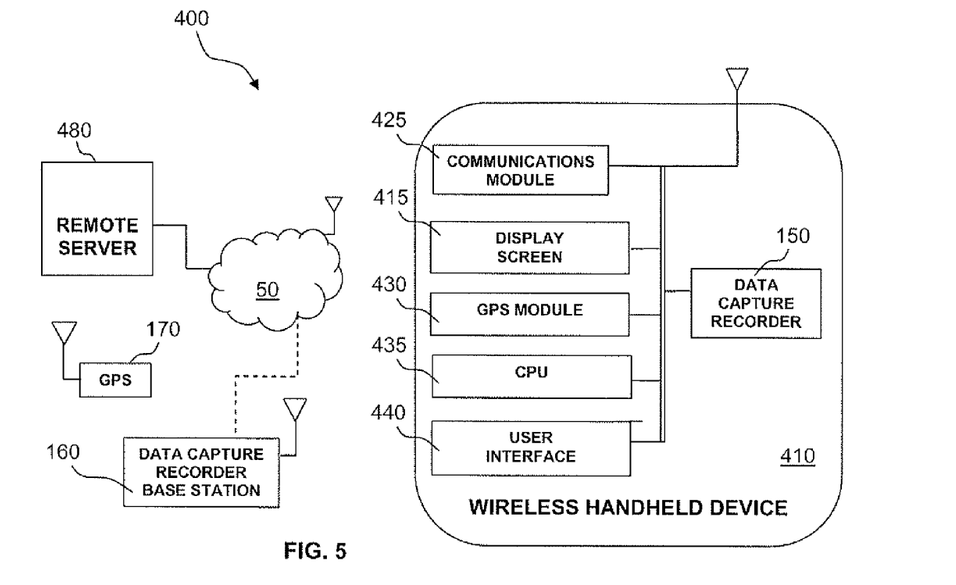
FIG. 5 illustrates a mobile system including a DCR and GPS, wherein synchronization and captured data can be transmitted wirelessly or cabled to the DCR base station for centralized data collection.

FIG. 5 illustrates a mobile system 400 including a DCR 150 and a GPS module 430 integrated within a wireless handheld device 410. The wireless handheld device 410 will typically include a user interface 440 (e.g., touch screen), a central processing unit 435, a display screen 415, and a communications module 425 that will enable the handheld device 410 to communicate wirelessly over data networks 50. Captured data can be transmitted wirelessly from the wireless handheld device 410 to the BCS 160 for centralized data collection. Entered data can be wirelessly transmitted from the DCR 150 to a BCS 160, wherein is can be processed (e.g., archived 165, analyzed 167). A BCS 160 can be provided with a database/memory accessible from remote server 480 to archive 165 and analyze 167 data received from DCR 150. An analysis module (not shown) can perform real-time or scheduled analysis 167 of stored data to detect patterns or patter variations.

Figure 6:
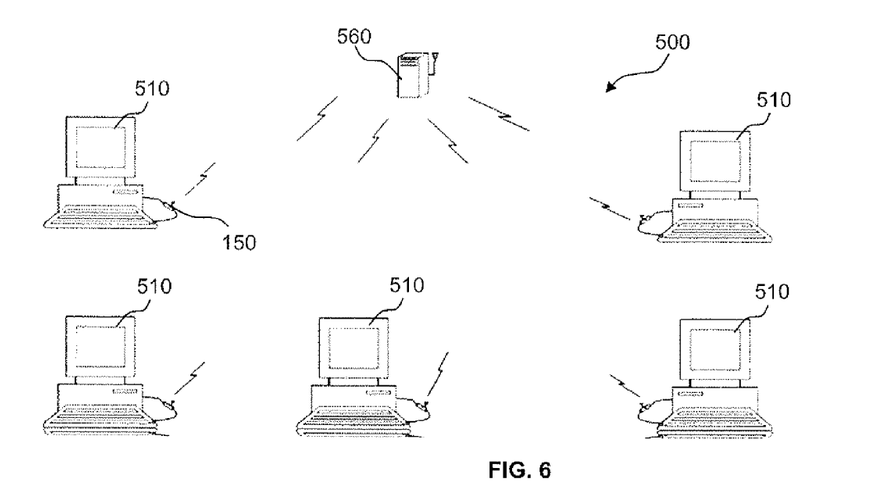
FIG. 6 illustrates an enterprise system implementation and setting, e.g., typical for financial institutions, wherein several clients are adapted with DCR capabilities are in communication with a BCS for data archiving.
Figure 7A:
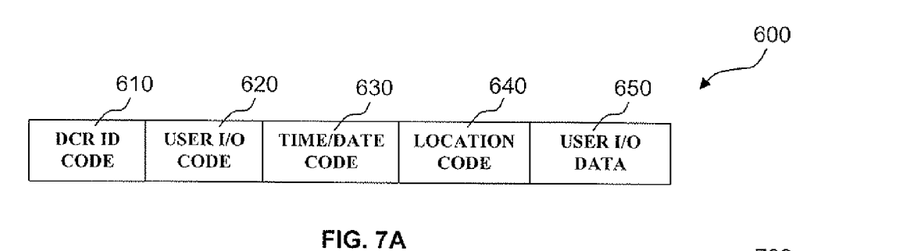
FIG. 7A-7B illustrates exemplary entry data coding segments that can be transmitted from a DCR, and received, archived, stored by a BCS.
Figure 7B:
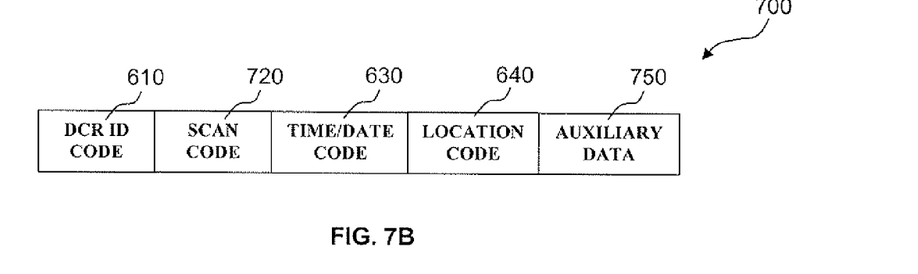

FIG. 6 illustrates an enterprise system implementation 500 wherein several client stations 510 including DCR 150 capabilities are in communication over a secure data network to a central computer 560 adapted with BCS 160 functionality. System architectures with several client machines is typical for financial institutions, wherein several clients can be adapted with DCR 150 capabilities in communication with a remote and secure BCS 160 for data archiving 165 and analysis 167, FIG. 7A-7B illustrates exemplary entry data coding segments that can be transmitted from a DCR 150, and received, archived 165, and stored by a BCS 160. For instance, FIG. 7A illustrates a data stream including; a DCR 150 ID code 610, a user I/O code 620, a time and date code 630, a location code 640 and user I/O data 650. FIG. 7B illustrated another exemplary data stream that includes: a scan code 720 and auxiliary data 750. It can be appreciated that other coding can be captured and delivered by the DCR 150 for transmission to a BCS 160 for archiving 165 and/or analysis 167, and these example data streams should not be taken as a limitation. More or less codes segments can be included in a data stream in accordance with and consistent with the teachings herein.

Figure 8:
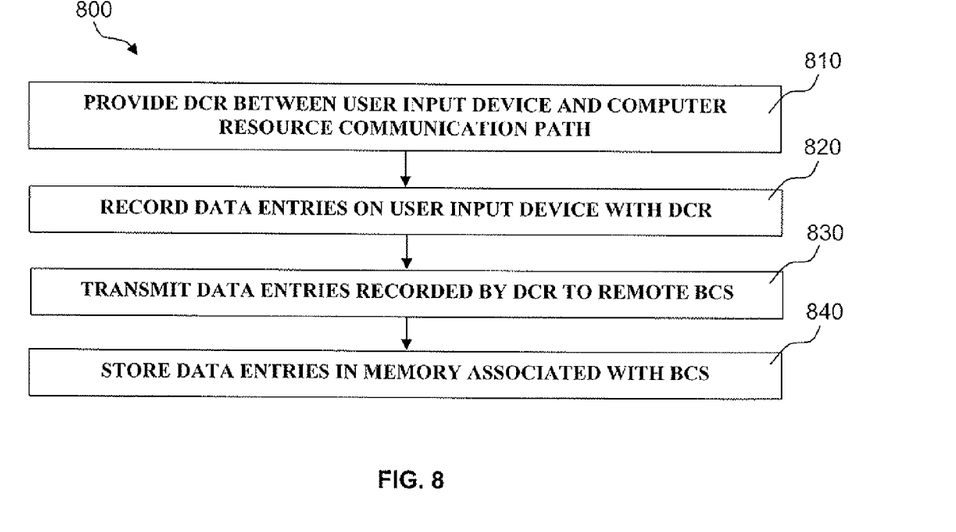
FIG. 8 illustrates a flow diagram of a method for capturing (e.g., recording) user input device entries on a DCR and transmitting entries to a BCS for archiving, in accordance with features the present invention.

FIGS. 8 through 16 illustrate various methods that can be implemented in accordance with implementing and utilizing features of the present invention. FIG. 8 illustrates a flow diagram 800 of a method for capturing (e.g., recording) user input device 110 entries on a DCR 150, and transmitting entries to a BCS 160 for archiving 165, in accordance with features of the present invention. Referring to Block 810, a DCR 150 is provided between a user input device 110 and a user computer system 120 (e.g., handheld, desktop computer) communication path. As shown in Block 820, data entries entered on the user input device 110 are recorded with the DCR 150. Then as shown in Block 830, data entries recorded by the DCR 150 are transmitted to a remote BCS 160. Finally, as shown in Block 840, data entries recorded by the DCR, 150 are stored in a memory associated with the BCS 160.

Figure 9:
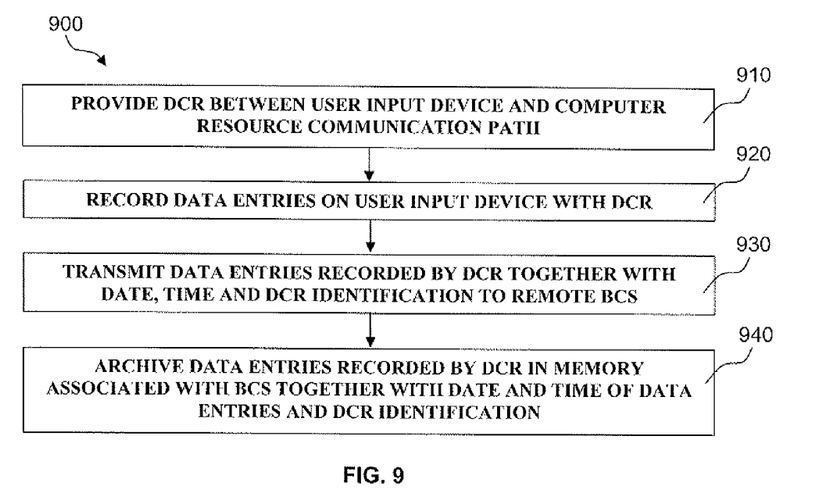
FIG. 9 illustrates a flow diagram of a method for capturing (e.g., recording) user input device entries on a DCR and transmitting entries to a BCS for archiving, in accordance with features the present invention.

FIG. 9 illustrates another flow diagram 900 for a method for capturing (e.g., recording) user input device 110 entries on a DCR 150 and transmitting entries to a BCS 160 for archiving 165, in accordance with features of the present invention. As shown in Block 910, a DCR 150 is provided in the communication path between a user input device 110 and a user computer system 120. At Block 920, data entries input on the user input device 110 are recorded with the DCR 150. At Block 930, data entries recorded by the DCR 150 together with date, time and DCR 150 identification information are transmitted to a remote BCS 160. Then at Block 940, data entries recorded by a DCR 150 are archived 165 in a memory associate with the remote BCS 160 together with the date and time of the data entries and DCR 150 identification information.

Figure 10:
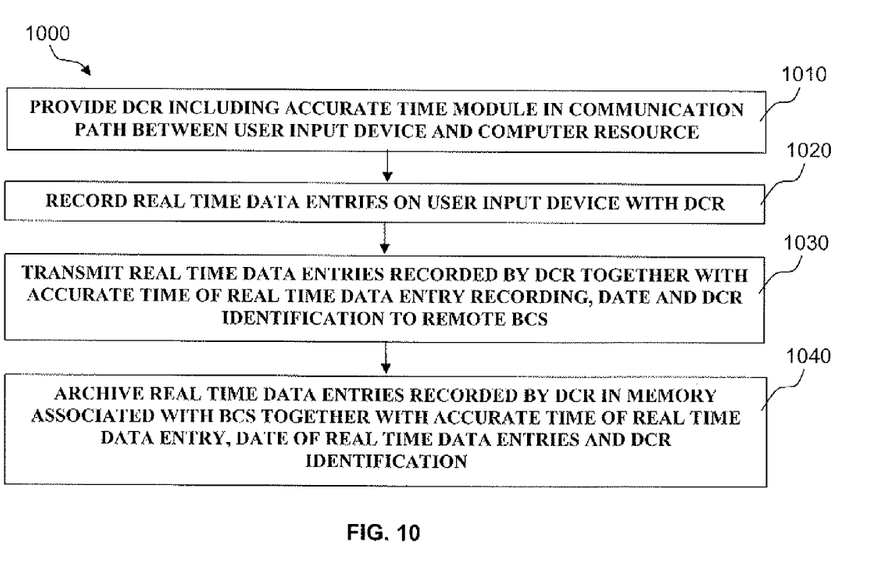
FIG. 10 illustrates a flow diagram of a method for capturing (e.g., recording) user input device entries on a DCR and transmitting entries to a BCS for archiving, in accordance with features the present invention.

FIG. 10 illustrates a flow diagram 1000 for a method for capturing (e.g., recording) user input device entries 110 on a DCR 150 and transmitting entries to a BCS 160 for archiving 165, in accordance with features of the present invention. As shown in Block 1010, a DCR 150 including an accurate time module is provided in the communication path between a user's input device 110 and a user computer system 120. As shown in Block 1020, real time data entries on the user input device 110 are recorded with the DCR. As shown in Block 1030, real time data entries recorded by the DCR 150 are transmitted to a remote BCS 160 together with accurate time of real time data entry recording, date, and DCR 150 identification. Then at Block 1040, the real time data entries recorded by the DCR 150, together with accurate time and date of real time entries and DCR 150 identification information, are archived 165 in a memory associated with the remote BCS 160.

Figure 11:
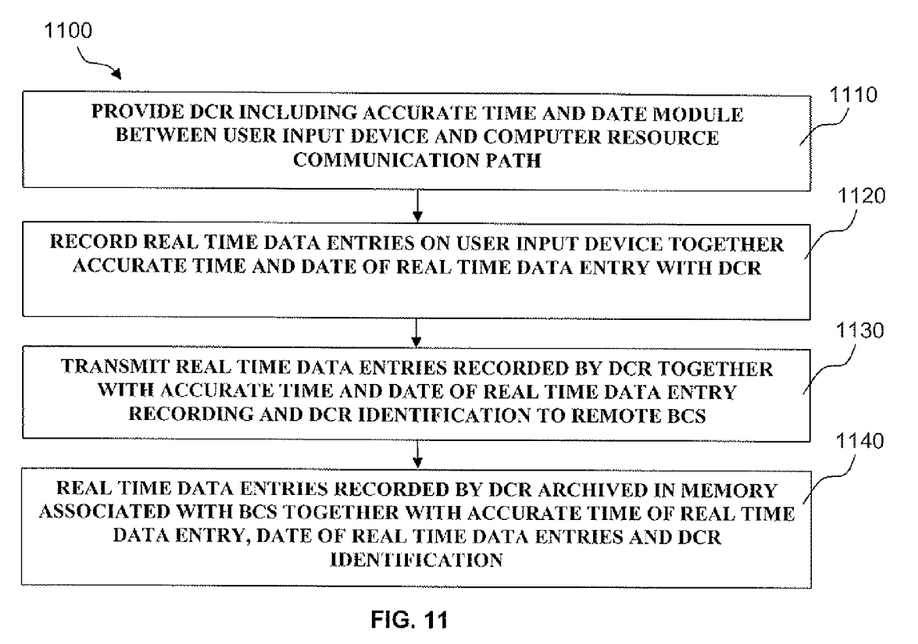
FIG. 11 illustrates a flow diagram of a method for capturing (e.g., recording) user input device entries on a DCR and transmitting entries to a BCS for archiving, in accordance with features the present invention.

Referring to FIG. 11, a flow diagram 1100 of a method for capturing (e.g., recording) user input device entries 110 on a DCR 150 and transmitting entries to a BCS 160 for archiving 165 is illustrated, in accordance with features of the present invention. Referring to Block 1110, a DCR 150 including an accurate time and date module is provided in the communication path between a user input device 110 and a user computer system 120. As shown in Block 1120, real time data entries input on the user input device 110 together with accurate time and date of real time entries are recorded at the DCR 150. As shown in Block 1130, the real time data entries recorded by the DCR 150 together with accurate time and date of the real time data entries and DCR 150 identification information are transmitted to a remote BCS 160. Then as shown in Block 1140, the real time data entries recorded by the DCR 150 are archived 165 in a memory associated with the remote BCS 160 together with accurate time and date of the real-time entries and the DCR 150 identification information.

Figure 12:
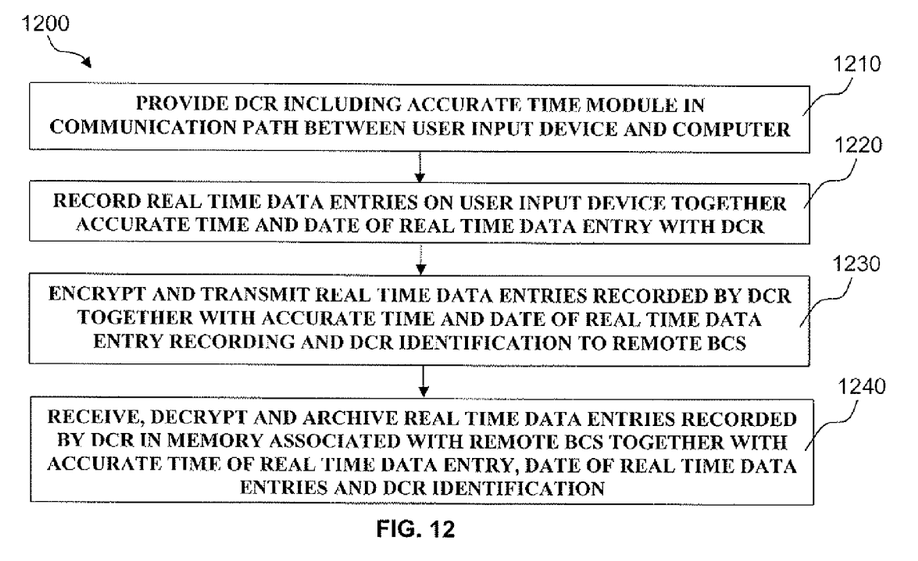
FIG. 12 illustrates a flow diagram of a method for capturing (e.g., recording) user input device entries on a DCR and transmitting entries to a BCS for archiving, in accordance with features the present invention.
Figure 13:
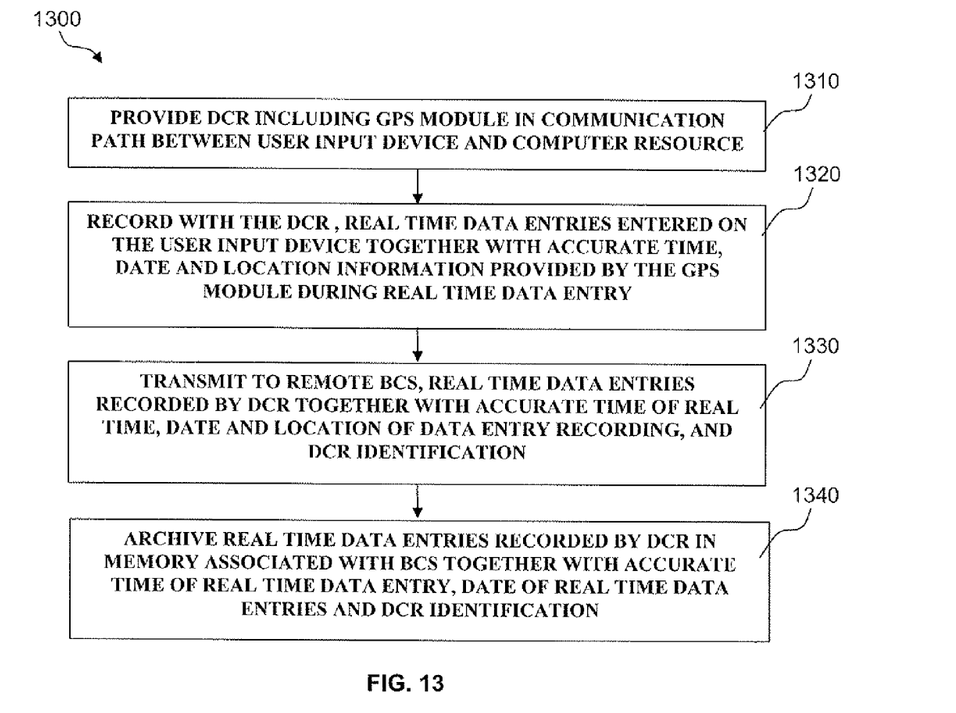
FIG. 13 illustrates a flow diagram of a method for capturing (e.g., recording) user input device entries on a DCR and transmitting entries to a BCS for archiving, in accordance with features the present invention.

FIG. 12 illustrates a flow diagram 1200 of another method for capturing (e.g., recording) user input device 110 entries on a DCR 150 and transmitting entries to a BCS 160 for archiving 165, in accordance with features of the present invention, As shown in Block 1210, a DCR 150 including accurate time module is provided in the communication path between a user input device 110 and a user computer system 120. As shown in Block 1220, real time data entries entered on the user input device 110 together with accurate time and date of real time data entries are recorded with the DCR 150. As shown in Block 1230, the real time data entries recorded by the DCR 150 together with date, time and DCR 150 identification are encrypted and transmitted to a remote BCS 160. As shown in Block 1240, the real time data entries, date, time and DCR 150 identification information are recorded by the DCR 150 are received, decrypted and archived 165 in a memory associated with the remote BCS 160, FIG. 13 illustrates a flow diagram 1300 of a method for capturing (e.g., recording) user input device 110 entries on a DCR 150 and transmitting entries to a BCS 160 for archiving 165, in accordance with features of the present invention. As shown in Block 1310, a DCR 150 including a GPS module 430 is provided in the communication path between a user input device 110 and a user computer system 120. Then as shown in Block 1320, real time data entries entered on the user input device 110 together with accurate time, date and location information provided by the GPS module 430 during real time data entry are recorded by the DCR 150. As shown in Block 1330, real time data entries recorded by the DCR 150 together with accurate time, date and location of entry together with DCR 150 identification are transmitted to a remote BCS 160. Then as shown in Block 1340, real time data entries recorded by the DCR 150, together with time, date, location and DCR identification information, are archived 165 in a memory associated with the remote BCS 160.

Figure 14:
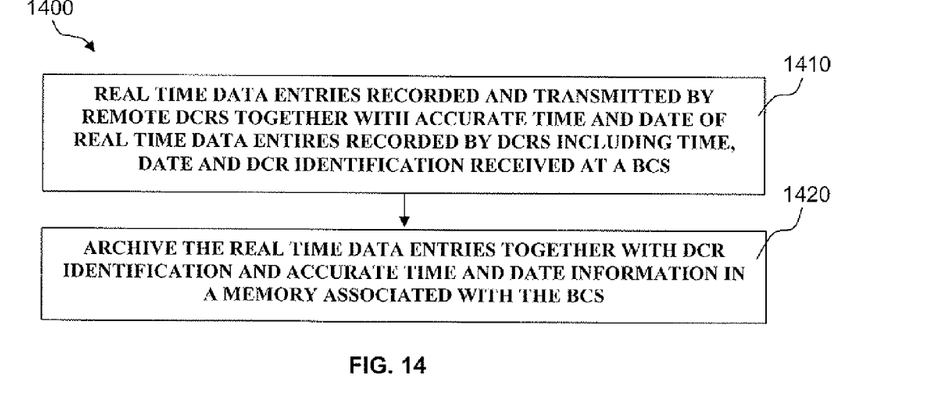
FIG. 14 illustrates a flow diagram of a method for capturing (e.g., recording) user input device entries on a DCR and transmitting entries to a BCS for archiving, in accordance with features the present invention.

FIG. 14 illustrates a flow diagram 1400 of a method of receiving entries at a BCS 160 for archiving 165, in accordance with features of the present invention. As shown in Block 1410, real time data entries recorded and transmitted by remote DCRs 150 together with accurate time and date of real time data entries and DCR 150 identification information are received at a BCS 160. As shown in Block 1420, the real time data entries together with DCR 150 identification are archived 165 in a memory associated with the BCS 160.

Figure 15:
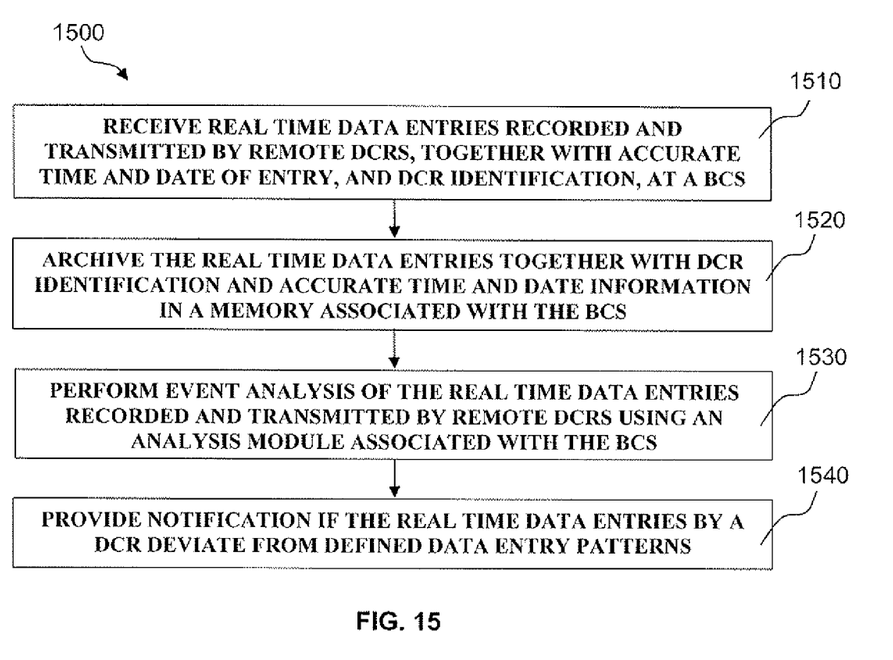
FIG. 15 illustrates a flow diagram of a method for capturing (e.g., recording) user input device entries on a DCR and transmitting entries to a BCS for archiving, in accordance with features the present invention.

FIG. 15 illustrates a flow diagram 1500 of a method of receiving entries at a BCS 160 for archiving 165, in accordance with features of the present invention, As shown in Block 1510, real time data entries recorded and transmitted by remote DCRs 150, together with accurate time and date of entry and DCR 150 identification, are received at a BCS 160, As shown in Block 1520, the real time data entries recorded and transmitted by remote DCRs 150 together with accurate time and date of entry and DCR 150 identifications are archived 165 a memory associated with the BCS 160. As shown in Block 1530, event analysis 167 is performed on the real time data entries recorded and transmitted by the remote DCRs 150 using an analysis 167 module associated with the BCS 160, Then as shown in Block 1540, notification is provided by the BCS 160 if real time data entries provided by a DCR 150 deviate from defined data entry patterns.

Figure 16:
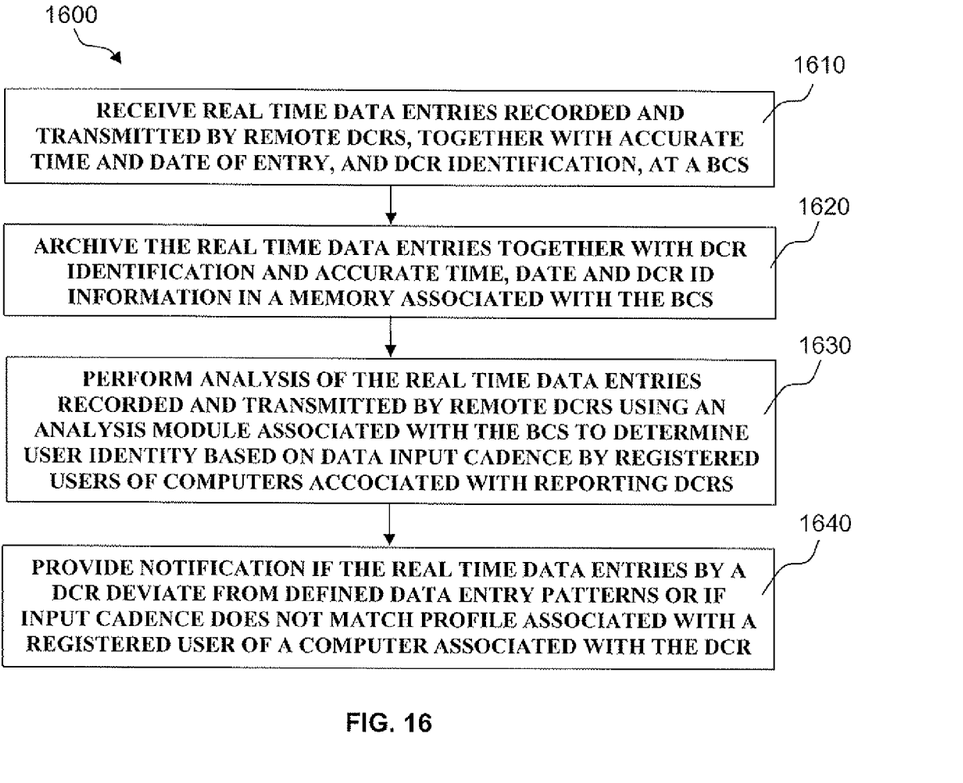
FIG. 16 illustrates a flow diagram of a method for capturing (e.g., recording) user input device entries on a DCR and transmitting entries to a BCS for analysis of user input cadence/patterns, in accordance with features the present invention.

FIG. 16 illustrates a flow diagram 1600 of a method for receiving user input device 110 entries by DCRs 150 at a BCS 160 for archiving 165 and analysis 167, in accordance with features of the present invention. As shown in Block 1610, real time data entries recorded and transmitted by remote DCRs 150, together with accurate time and data of entry and DCR 150 identification are received at a BCS 160. As shown in Block 1620, the real time data entries, together with accurate time, date and DCR 150 identification information are archived in a memory associated with the BCS 150. Then as shown in Block 1630, analysis 167 is performed on the real time data entries using an analysis 167 module associated with the BCS 160 to determine user identify based on data input cadence by registered users of computers associated with reporting DCRs 150. Then as shown in Block 1640, notification is provided by the BCS 160 if the real time data entries by a reporting DCR 150 deviate from defined data entry patterns or if input cadence does not match a profile associated with a registered user of a computer associated with a reporting DCR 150.

Non-intrusive application. The device can be installed in-line between the user's computer unit and the user's input device (keyboard, mouse, etc) and operates transparently with respect to the user's computer software. There is no software installation on the user's or user network computer therefore it will not affect the performance of the user's computer or its network computer. There are no compatibility issues that need to be resolved as is typical with computer software-based systems.

Physical transparency. The device can also be installed inside the user's computer system or within the user input device which would make it physically transparent to the user including users with system administrative rights (e.g., "super users").

Data Entry Backup. Information is collected directly from the user's input device and safely stored in a media that is completely separate from the user's computer system. Therefore, valuable data entries can be recovered and corroborated.

The keystrokes are precisely date and time tagged to provide accurate history logs for regulatory auditing and system administrative troubleshooting.

Computer failure troubleshooting. In the case of a catastrophic computer failure, saved information on the invented device can be used to troubleshoot the problem and determine if the failure was caused by inadvertent super user action or by a malicious company insider.

Not dependent on the user's operating system. Since the device is separate from the user's computer, it is not dependent on the user's operating system or any of the user's applications.

Virus free. The device would be virtually virus free since it would not be directed connected to the internet via the user's computer. One application would be capturing keystrokes from a keyboard. The device itself would be impervious to viruses, spam ware, spyware, or any number of malicious software on the host computer system.

Software monitoring tools can be blocked or disabled. Software keyloggers can easily be disabled by a super user. There are also numerous anti-keylogging software solutions available. For example, Patent application#20070245343 describes a "System and method for blocking keyloggers".

Precision time tagging. PC clocks rarely have a correct rate (they lose or gain time significantly). The invention device will precisely time and date tag each user input data by means of an atomic time server in which accurate timing information is obtained and then used to synchronize to the invention device's real-time clock.

GPS interface. The invention device will have a GPS receiver to obtain accurate information on the unit's location. The Global Positioning System (GPS), although designed for navigation, can also provide very precise time synchronization (to within one microsecond of Coordinated Universal Time (UTC).

The critical customer needs that our product would fulfill are outlined as follows:

Monitoring of the super user(s) of a company's main computer system. Super users are unique in that they have total access to all the resources and files within a company's computer system including financial and propriety information. Monitoring software programs are installed by the super user and the same monitoring software can be temporarily disabled by the super user.

Regulatory Compliance. Controversial United States federal laws have been passed in response to a number of major corporate and accounting scandals including those affecting Enron, Tyco International, Peregrine Systems and WorldCom (recently MCI and now currently part of Verizon Business). These scandals resulted in a decline of public trust in accounting and reporting practices. In the immediate future, the federal government is expected to enforce stringent auditing and accountability requirements. Our product may fulfill the need to comply with some or most of these requirements.

Computer System Troubleshooting and Recovery. Because of numerous software programs running simultaneously on a single main frame server, there can be a catastrophic computer crash in which history logs would not be available. Our product would have a completely separate computer system that would have standalone applications of our product and that would capture and archive all keyboard actions leading to any major computer crash. This would be akin to the black box in the aeronautic industry.

The invention claimed is:

1. A data security system, comprising:
    a standalone data capture recorder that does not require a host computer for its installation or operation, installed in the communications path between a user interface and a user computer system connected to the user interface, said data capture recorder non-intrusively captures in real-time user's input directly from said user interface, said data capture recorder adapted to record, time stamp user inputs at the user interface and transmit user input data to a base collection station, wherein said user interface comprises one or more of the following: a computer keyboard, a user input pad, or a mouse;
    an accurate time module adapted to provide an accurate said time stamp from at least one atomic clock transmission for said user inputs entered at said user interface;
    a base collection station located remote from the data capture recorder, the user interface and the user computer system and adapted to receive user input data comprising at least one of timing or cadence of each key stroke for archiving in a memory associated with the base collection station; and
    an analysis module that compares user input received from said data capture recorder with data input patterns stored in said memory associated with said base collection system, wherein if said user input deviates from defined said data input patterns, a notification is provided by said base collection station in real time.

2. A method of providing data security at a computer system, comprising:
    providing a standalone data capture recorder that does not require a host computer for its installation or operation along a communication path between a user input device and a computer system;
    recording non-intrusively real-time user data input entries directly at the user input device with the data capture recorder, wherein said user input device comprises one or more of the following: a computer keyboard, a user input pad, or a mouse;
    providing an accurate time module adapted to provide an accurate said time stamp from at least one atomic clock transmission for said user inputs entered at said user input device,
    transmitting real-time data entries comprising at least one of timing or cadence of each key stroke from the data capture recorder to a remote base collection station;
    analyzing said real-time data entries using an analysis module associated with said base collection station to determine user identity; and
    notifying in real time deviations of said real-time data entries from a defined data entry patterns or if input cadence does not match a profile associated with a registered user associated with said data capture recorder.

3. The method of providing data security at a computer system of claim 2, including the step of providing accurate date and time information for real-time user data input entries at the user input device before the step of transmitting real-time data entries from the data capture recorder to a remote base collection station.

4. The method of providing data security at a computer system of claim 2, wherein the real-time user data input entries at the accurate date and time information is transmitted by the data capture recorder to the base station controller via at least one of a wireless connection and network cable connection.

5. The method of providing data security at a computer system of claim 2, wherein at least one of the user input device and the data capture recorder is uniquely identified to the base station controller with at least one of a product code, identification number and address.

6. The method of providing data security at a computer system of claim 2, including the step of providing accurate date, time and at least one of product code, identification number and address information for real-time user data input entries at the user input device before the step of transmitting real-time data entries from the data capture recorder to a remote base collection station, 7. The method of providing data security at a computer system of claim 6, wherein at least one of an assigned location and physical location information for at least one of the data capture recorder is stored at said base collection station.

8. The method of providing data security at a computer system of claim 6, wherein data including the real-time user data input entries, and accurate date and time information for the real-time user data input entries, for at least one of the user input device and the data capture recorder are received by a base station controller wherein the data is archived.

9. The method of providing data security at a computer system of claim 6, wherein data including the real-time user data input entries, accurate date and time information for the real-time data entries, and location information for at least one of the user input device and the data capture recorder are received by a base station controller wherein the data is archived and analyzed to determine if real-time data entries deviate from a defined data entry patterns or if input cadence does not match a profile associated with a registered user of a computer associated with the data capture recorder.

10. A method of providing data security at a computer system, comprising:
   providing a standalone data capture recorder that does not require a host computer for its installation or operation along a communication path between a user input device and a computer system;
   recording non-intrusively real-time data entries by a user directly at the user input device with the data capture recorder wherein said user input device comprises one or more of the following: a computer keyboard, a user input pad, or a mouse;
   providing accurate date and time information provided by at least one of atomic clock information for the real-time data entries at the user input device;
   transmitting real-time data comprising at least one of timing or cadence of each key stroke from the data capture recorder to a remote base collection station via at least one of a wireless connection and network cable connection, wherein the real-time data entries are archived;
   analyzing said real-time data entries using an analysis module associated with said base collection station to determine user identity; and
   notifying in real time deviations of said real-time data entries from a defined data entry patterns or if input cadence does not match a profile associated with a registered user associated with said data capture recorder.

11. The method of providing data security at a computer system of claim 10, wherein at least one of the user input device and the data capture recorder is uniquely identified to the base station controller with at least one of a product code, identification number and address.

12. The method of providing data security at a computer system of claim 10, including the step of obtaining location information for real-time data entries at the user input device together with the real-time data entries and accurate date and time information before the step of transmitting real-time data entries from the data capture recorder to a remote base collection station, and transmitting the location information to the base controller system with the real-time data entries and accurate date and time information to the base controller system.

13. The method of providing data security at a computer system of claim 12, wherein location information for at least one of the data capture recorder and the user input device is obtained using said atomic clock.

14. The method of providing data security at a computer system of claim 12, wherein data including the real-time user data input entries, accurate date and time information for the real-time user data input entries, and location information for at least one of the user input device and the data capture recorder are received by a base station controller wherein the data is archived.

15. The method of providing data security at a computer system of claim 12, wherein data including the real-time user data input entries, accurate date and time information for the real-time data entries, and location information for at least one of the user input device and the data capture recorder are received by a base station controller wherein the data is archived and analyzed to determine if real-time data entries deviate from a defined data entry patterns or if input cadence does not match a profile associated with a registered user of a computer associated with the data capture recorder.

16. The method of providing data security at a computer system of claim 12, wherein data including the real-time user data input entries and at least one of accurate date and time information for the real-time user data input entries, and location information for at least one of the user input device and the data capture recorder, are received by a base station controller wherein the data is analyzed to determine if real-time data entries deviate from a defined data entry patterns or if input cadence does not match a profile associated with a registered user of a computer associated with the data capture recorder.

17. The data security system of claim 1, wherein if an input cadence does not match a profile associated with a registered user of a computer associated with said data capture recorder in said analysis module, notification is provided in real time by said base collection station.

18. The data security system of claim 1, wherein said data capture recorder further performs encryption functions on said time stamped user inputs.

19. The data security system of claim 1 wherein said base collection station collects at least one of the data capture recorder identification information to identify an origin of the key stroke biometric information collected from said computer system.

* * * * *